Figure 3:
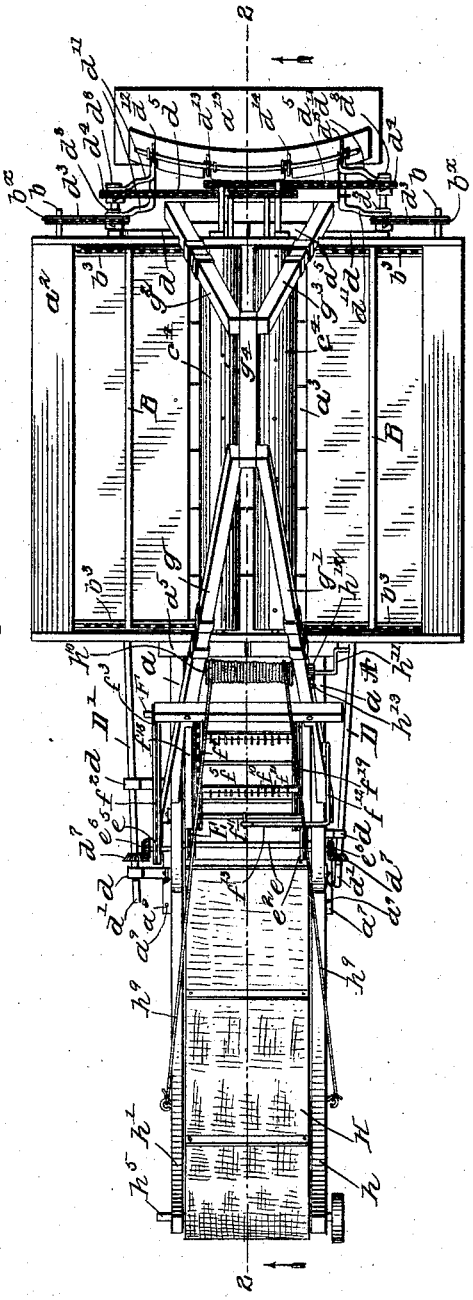

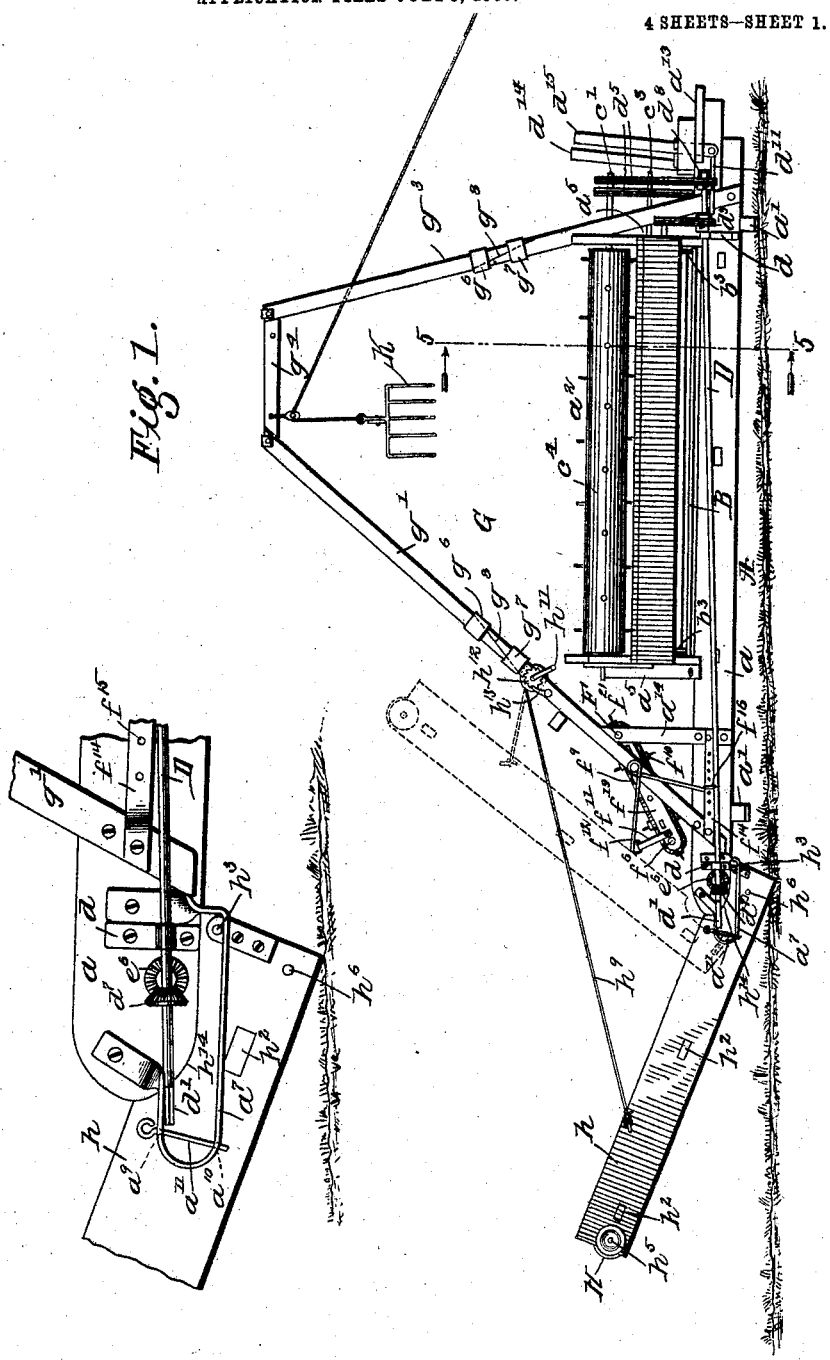

No. 850,838. PATENTED APR. 16, 1907.
T. N. JOHNSEN.
THRESHER FEEDER.
APPLICATION FILED JULY 3, 1906.
4 SHEETS—SHEET 2.
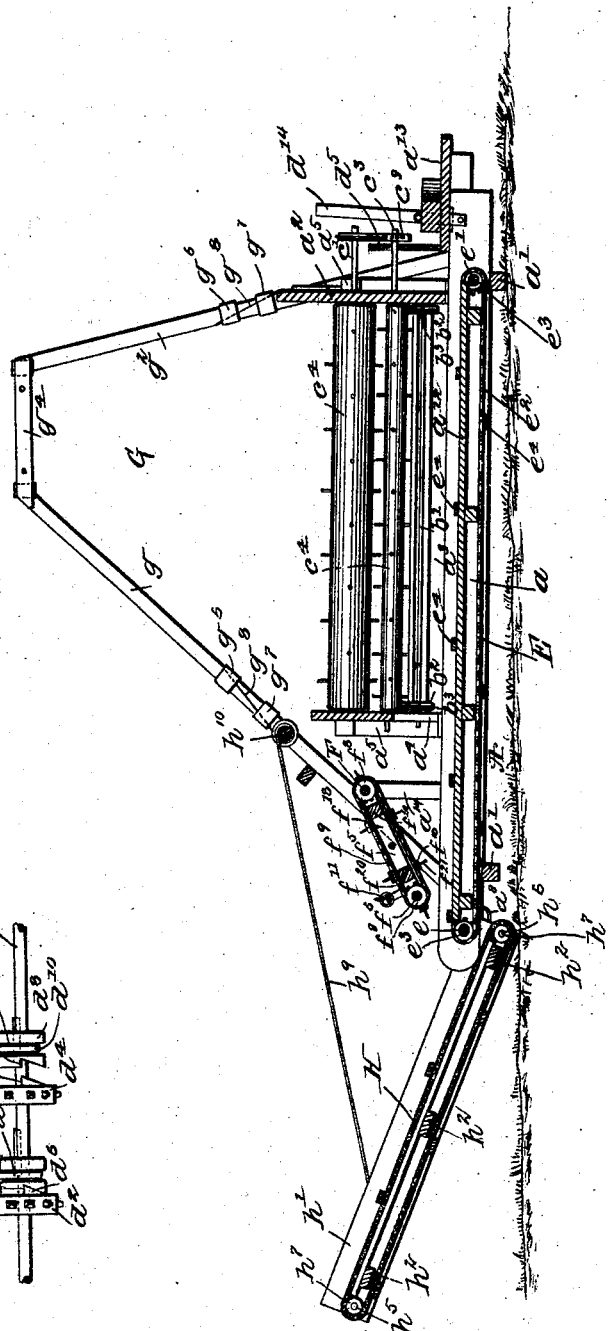
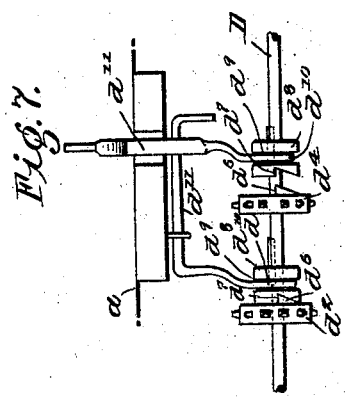
WITNESSES
INVENTOR
TORIS N. JOHNSEN.
BY
ATTORNEYS No. 850,838. PATENTED APR. 16, 1907.
T. N. JOHNSEN.
THRESHER FEEDER.
APPLICATION FILED JULY 3, 1906.

4 SHEETS—SHEET 3.

WITNESSES
INVENTOR
TORIS N. JOHNSEN.
BY
ATTORNEYS

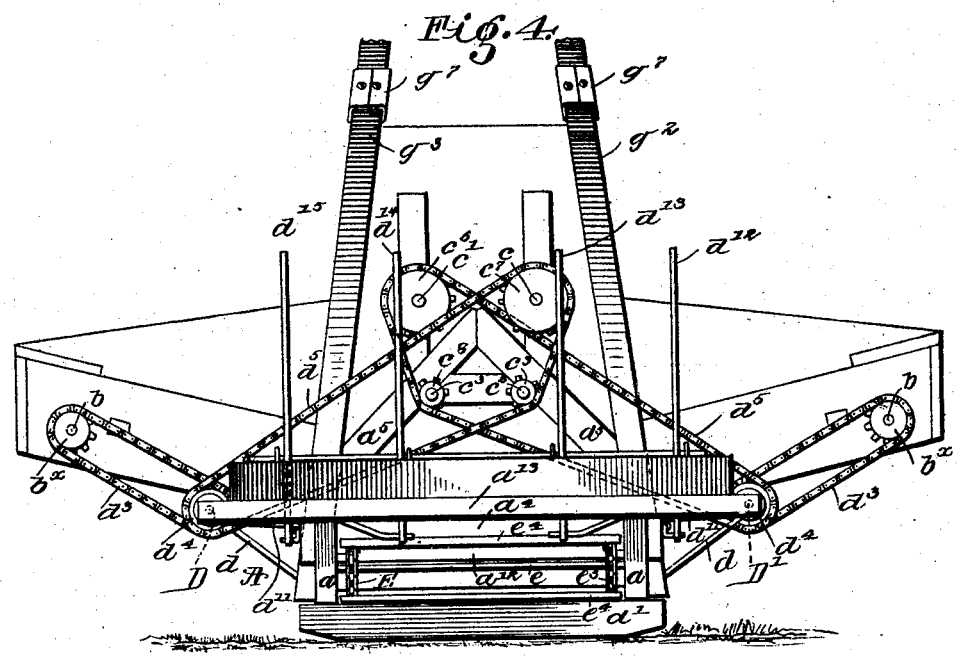
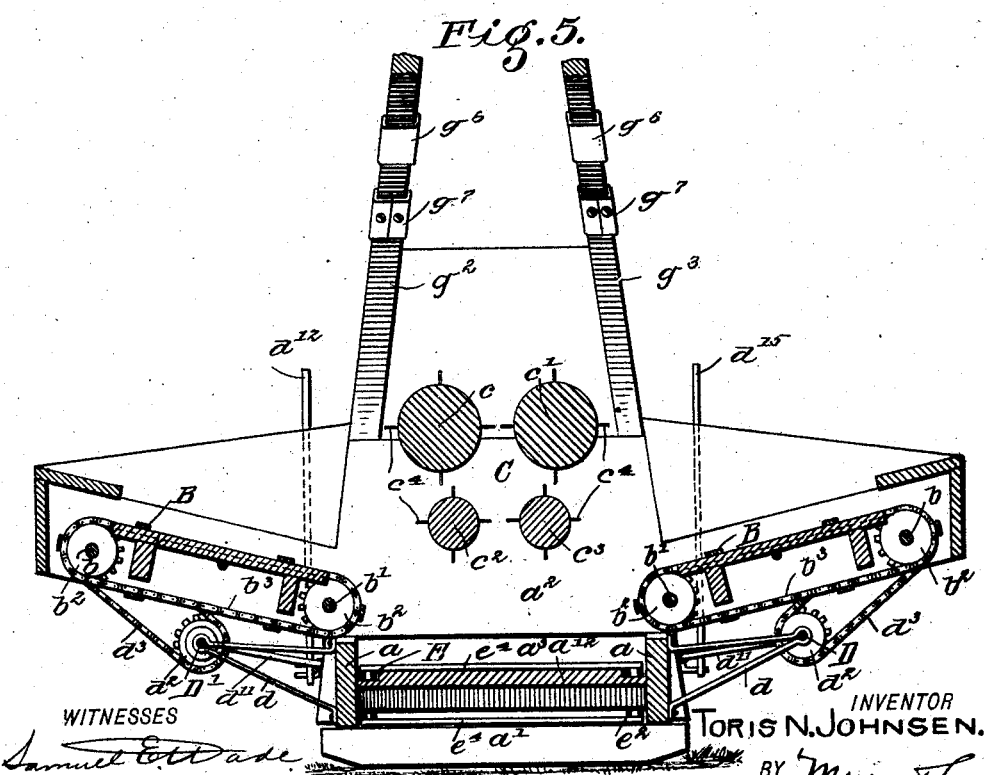

UNITED STATES PATENT OFFICE.

TORIS N. JOHNSEN, OF CLARK, WASHINGTON.

THRESHER-FEEDER.

No. 850,838.      Specification of Letters Patent.      Patented April 16, 1907.

Application filed July 3, 1906. Serial No. 324,574.

*To all whom it may concern:*

Be it known that I, TORIS N. JOHNSEN, a citizen of the United States, and a resident of Clark, in the county of Lincoln and State of Washington, have made certain new and useful Improvements in Thresher-Feeders, of which the following is a specification.

My invention is an improvement in thresher-feeders, and consists in certain novel constructions and combinations of parts, as hereinafter described and claimed.

Referring to the drawings forming a part hereof, Figure 1 is a side view of my improvement. Fig. 2 is a longitudinal section on the line 2 2 of Fig. 3 looking in the direction of the arrows. Fig. 3 is a plan view. Fig. 4 is an end view from the rear. Fig. 5 is a section on the line 5 5 of Fig. 1. Fig. 6 is an enlarged detail view of a portion of Fig. 1. Fig. 7 is an enlarged detail view of one of the clutch mechanisms.

In the present embodiment of my invention I provide a frame A, comprising the longitudinal bars $a$, connected by the cross-bars $a'$. An endless carrier E is supported in the frame, the carrier comprising sprocket-chains $e^2$, connected at intervals by slats $e^4$ and supported by sprocket-wheels $e^3$ upon shafts $e\ e'$, journaled in opposite ends of the frame, the frame being provided with a floor $a^{12}$ between the runs of the carrier, the said floor being arranged between the shafts $e\ e'$.

A hopper $a^2$ is supported on the frame, the said hopper having the longitudinal opening $a^3$ in the bottom thereof and an opening $a^4$ in the front end thereof and is supported by suitable braces $a^5$ at its front and rear ends, respectively. The sides of the hopper extend laterally from the frame and are almost horizontal, and shafts $b\ b'$ are journaled at the inner and outer edges of the sides of the hopper, the shafts being supplied with sprocket-wheels $b^2$, upon which travel sprocket-chains $b^3$, connected at intervals by vanes or flights B, one run of the carrier passing on the inside of the side of the hopper and the other on the outside.

A hoe-down C is arranged above the longitudinal opening in the hopper, the hoe-down comprising a plurality of rollers $c\ c'\ c^2\ c^3$, provided with teeth $c^4$ and journaled in the hopper above the opening and longitudinally of the frame, the ends of the roller-shafts outside of the hopper being provided with sprocket-wheels $c^6\ c^7\ c^8\ c^9$ for a purpose to be hereafter described. The toothed rollers are arranged in pairs, one pair above the other, the upper pair $c\ c'$ being of relatively large diameter and the lower pair $c^2\ c^3$ being of relatively small diameter, and the rollers are adapted to rotate outwardly from each other when the hoe-down is in operation.

Shafts D D' are journaled in brackets $d$ upon the outer side of each of the longitudinal bars $a$, and each of the shafts has its front end squared, as at $d'$, whereby to connect it to the threshing-machine. A sprocket-wheel $d^2$ is loosely journaled upon each of the shafts, near the rear end thereof, and is connected by a sprocket-chain $d^3$ to a sprocket-wheel $v^\times$ upon the outer end of each of the shafts $b$ at the outer edge of the hopper. A second sprocket-wheel $d^4$ is loosely journaled upon each of the shafts behind the sprocket-wheel $d^2$ and is connected by a sprocket-chain $d^5$ with certain of the rollers of the hoe-down. The sprocket-chain $d^5$, connected with the sprocket-wheel $d^4$ upon the shaft D, extends over the sprocket-wheels $c^7$ on the shaft $c$ and under the sprocket-wheel $c^9$ on the shaft $c^3$, while the chain $d^5$, leading from the sprocket $d^4$ of the shaft D', extends over the sprocket $c^6$ and under the sprocket $c^8$. It will be understood that the sprocket-wheels $c^7\ c^9$ are arranged in a plane to the rear of the plane occupied by the sprocket-wheels $c^6\ c^8$ and that the sprocket $d^4$ upon the shaft D rotates the rollers $c\ c^2$, while the sprocket $d^4$ upon the shaft D' rotates the rollers $c'\ c^3$.

Each of the sprocket-wheels $d^2\ d^4$ upon the shafts D D', as before stated, is loosely journaled thereon, and each of said sprocket-wheels is provided with a clutch-face $d^6$, adapted to be engaged by a clutch-face $d^7$ upon a sleeve $d^8$ slidable longitudinally of the shaft, but keyed thereto and operated by means of a fork $d^{10}$ upon a lever $d^{11}$ slidably mounted on the frame, the said fork engaging a groove $d^9$ in the sleeve and the opposite end of the lever $d^{11}$ being pivoted to one of a plurality of levers $d^{12}\ d^{13}\ d^{14}\ d^{15}$, pivoted upon a platform $a^{13}$, arranged on the rear of the frame behind the hopper.

A derrick G is arranged above the hopper, the said derrick comprising the uprights $g\ g'\ g^2\ g^3$, arranged in pairs at the front and the rear of the frame and extending upwardly and inwardly toward each other, a longitudinal bar $g^4$ being arranged between the ends of the bars, whereby to connect said bars to each other. The uprights are divided at approximately the centers thereof upon a sloping line $g^8$, and each of the beveled ends is provided with a band $g^6$ $g^7$, the said band encircling the beveled end of that portion of the upright to which it is attached and receiving loosely the point of the beveled end of the opposite portion. It will be understood that the upper portion of the derrick may be removed from the lower portion merely by lifting said upper portion away from the lower portion.

A shaft F is journaled in a pair of braces $a^{14}$, connected with the front uprights $g$ $g'$ of the frame, and the outer end of the shaft is provided with a sprocket-wheel $f^3$, connected by a sprocket-chain $f^2$ with a sprocket-wheel $e^5$ upon the shaft $e$, journaled in the front end of the frame. A frame $f^5$, comprising the longitudinal bars $f^{18}$ $f^{19}$ and the cross-bars $f^{20}$, is mounted to swing upon the shaft F, and the outer end of the frame is provided with a shaft $f^6$. The shaft F and the shaft $f^6$ are provided with sprocket-wheels $f^8$ at each end thereof within the frame $f^5$, and upon the sprocket-wheels are supported chains $f^9$, connected at suitable intervals by slats $f^{10}$, provided with teeth $f^{21}$ for a purpose to be hereafter described. A yoke $f^{11}$ is connected with the longitudinal bars of the frame, and connected to the yoke is the angular portion $f^{13}$ of one arm of a rock-lever $f^{12}$, pivoted to one of the uprights $g$, the other arm of the rock-lever being engaged by a bracket $f^{14}$ on one of the longitudinal members of the frame, the bracket being provided with holes $f^{15}$ for receiving a pin $f^{16}$, whereby to retain the rock-lever in its adjusted position.

The shaft $e$ is also provided at each end with a beveled gear $e^6$ engaging a beveled gear $d^7$ upon the shafts D D', before described.

A draper H is connected to the front end of the frame A for receiving the material from the carrier B and delivering it to the threshing-machine. The said draper is supported upon a frame comprising side bars $h$ $h'$, connected by cross-bars $h^2$, the side bars having journaled at each end thereof shafts $h^5$ $h^6$, provided with rollers $h^7$, upon which is supported the draper H. The inner ends of the side bars $h$ $h'$ are provided with pins $h^3$, which slidably engage curved brackets $a^7$ $a^8$, secured to the front end of the longitudinal bars $a$ $a'$ of the frame A, and the upper edge of the longitudinal bars of the draper are cut away, as at $h^{14}$, whereby said bars may be slipped beneath the bars $a$ of the frame A. Ropes $h^9$ are connected with each side of the draper-frame near the outer end thereof, the ropes extending to a shaft $h^{10}$, journaled in the uprights of the derrick, the shaft being provided with a handle $h^{11}$, whereby to manipulate the same, and with a ratchet-wheel $h^{12}$ engaged by a pawl $h^{13}$ upon the uprights, whereby to retain the shaft in its adjusted position.

The brackets $a^7$ $a^8$ are provided with alined openings $a^9$ $a^{10}$ for receiving a pin $a^{11}$, the pin passing behind the pins $h^3$ of the draper, whereby to prevent the backward movement of the draper beneath the frame A when it is desired to pull the draper upward and over into contact with the uprights of the derrick.

The shafts D D' rotate in opposite directions and in such direction as to rotate the members of the pairs of hoe-down rollers outwardly from each other. It will be evident that this rotation will move the upper runs of the carriers on the side of the hopper inwardly to deliver to the carrier B, while the carrier B will be moved in a direction to deliver to the draper, and since the shaft $f^6$ rotates in the same direction as the shaft $e$ the lower run of the chains $f^9$ will move in the opposite direction to the upper run of the carrier B. By means of the levers $d^{12}$ $d^{13}$ $d^{14}$ $d^{15}$ either of the carriers in the sides of the hopper may be disconnected from the shaft D D' or the hoe-down rollers may be also disconnected. The draper may be driven directly from the threshing-machine or by any other suitable means.

In operation the wheat-straw is carried to the machine in any suitable manner and is lifted into the hopper by any suitable means, as by the forks K. (Shown in Fig. 1.) The straw is dropped onto the hoe-down by the forks, and the toothed rollers rotating outwardly away from each other tear the bunches apart, throwing them out on the endless carriers in the sides of the hopper, which deliver them through the opening in the bottom of the hopper onto the endless carrier B, from whence they pass to the draper and to the machine. By means of the swinging frame $f^5$ the feed of the carrier B to the draper may be regulated, since the adjacent run of the carrier on the swinging frame and the carrier B move in opposite directions, and by swinging the frame nearer or farther from the carrier B the layer of straw delivered to the draper may be nicely regulated. When it is desired to move the feeder, the upper portion of the derrick may be removed and the draper thrown up and over against the front pair of supports, until it rests thereon, thus placing the device in compact shape for transportation.

I claim—

1. A thresher-feeder, comprising a frame composed of longitudinal bars and connecting cross-bars, an endless carrier arranged longitudinally of the frame, a derrick supported on the frame, a hopper having an open bottom arranged upon the frame below the derrick, said hopper having wings extending laterally from the frame, endless carriers supported on the wings and delivering to the carrier of the frame, a plurality of toothed rollers journaled in the hopper above the opening in the bottom thereof and longitudinally of the frame, said rollers being arranged in pairs, one pair above the other, and the members of each carrier rotating outwardly from each other, a swinging frame supported above the delivery end of the carrier on the frame, an endless carrier supported on the swinging frame, the adjacent runs of said last-named carriers moving in opposite directions, means for adjusting the position of the swinging frame, and a draper connected to the front of the frame to which the carrier of the frame delivers.

2. A thresher-feeder, comprising a frame, a hopper having an open bottom supported by the frame, a derrick above the hopper, a plurality of pairs of toothed rollers journaled in the hopper above the opening, said pairs being arranged one above the other, and the members of the pairs rotating outwardly from each other, an endless carrier in the bottom of the frame, endless carriers on the side of the carrier and delivering to the first-named carrier, a draper to which the first-named carrier delivers, a swinging frame mounted above the main frame, an endless carrier provided with teeth supported by the swinging frame and arranged above the first-named carrier, the adjacent runs of the carriers moving in opposite directions.

3. A thresher-feeder, comprising a frame, a hopper having an open bottom supported by the frame, a derrick above the hopper, a plurality of pairs of toothed rollers journaled in the hopper above the opening, said pairs being arranged one above the other, and the rollers of the pairs rotating outwardly from each other, an endless carrier in the bottom of the frame, endless carriers on each side of the hopper and delivering to the first-named carrier, and a draper to which said first-named carrier delivers.

4. A thresher-feeder, comprising a hopper having an open bottom, a derrick above the hopper, a pair of toothed rollers journaled in the hopper above the opening, the members of said pair rotating outwardly in opposite directions, an endless carrier below the hopper, endless carriers on each side of the hopper and delivering to the first-named carrier, and a draper to which said first-named carrier delivers.

5. A thresher-feeder comprising a hopper provided with means for separating the straw, a frame comprising longitudinal members below the hopper, an endless carrier supported in the frame to which said hopper delivers, brackets on the ends of the longitudinal members of the frame, a draper comprising a frame composed of longitudinal members and an endless carrier supported on the frame, the longitudinal members of said draper-frame being provided with pins engaging said brackets and slidable therein, whereby to permit the adjustment of the draper-frame, and means engaging the pins and the brackets for retaining the draper in its adjusted position.

6. A thresher-feeder comprising a hopper, provided with means for separating the straw, a frame for supporting the hopper and comprising longitudinal members arranged therebelow and spaced apart from each other, an endless carrier supported by the frame, a swinging frame supported above the endless carrier near the delivery end thereof, shafts journaled in the end of the swinging frame, sprocket-wheels near the end of the shafts, sprocket-chains supported on the wheels, slats provided with teeth connecting the chains at intervals, and means for driving said chains in a direction opposite to the movement of the carrier.

7. A thresher-feeder comprising a hopper having an open bottom, a derrick above the hopper, means supported above the open bottom of the hopper for separating the straw, an endless carrier below the hopper, endless carriers on each side of the hopper and delivering to the first-named carrier, and a draper to which said first-named carrier delivers.

TORIS N. JOHNSEN.

Witnesses:
 E. A. HESSELTINE,
 M. M. BAKER.